United States Patent [19]
Brandner et al.

[11] Patent Number: 5,469,436
[45] Date of Patent: Nov. 21, 1995

[54] POLLING-TYPE DIGITAL COMMUNICATIONS SYSTEM HAVING PSEUDO-BALANCED MODE

[76] Inventors: James M. Brandner, 2745 50th Ave. SE., Rochester, Minn. 55904; Robert J. Manulik, 1448 Chippewa Dr. NW., Rochester, N.Y. 55901; Arthur J. Meyer, III, 505 7th St. SW., Oronoco, Minn. 55960; Mark E. Schreiter, 2828 Paradise Ct. SW., Rochester, Minn. 55902

[21] Appl. No.: 950,629

[22] Filed: Sep. 24, 1992

[51] Int. Cl.$^6$ .................................................. H04J 3/16
[52] U.S. Cl. .................. 370/85.2; 370/85.8; 370/825.08
[58] Field of Search ............................... 370/85.8, 85.2, 370/94.1; 340/825.08

[56] References Cited

U.S. PATENT DOCUMENTS 4,924,461  5/1990  Amemiya et al. .................. 370/95.2
5,010,329  4/1991  Nagakura et al. .................. 340/825.08
5,132,680  7/1992  Tezuka et al. ..................... 370/85.8
5,166,675  11/1992 Amemiya et al. .................. 370/85.8
5,170,394  12/1992 Biber et al. ...................... 370/85.8

*Primary Examiner*—Douglas W. Olms
*Assistant Examiner*—Min Jung
*Attorney, Agent, or Firm*—J. Michael Anglin

[57] ABSTRACT

A large communications network is linked to a primary terminal and a secondary terminal. The primary polls the secondary whenever it has data to send, and need not poll at any maximum fixed interval. The poll operation sends a sequence of data frames to the secondary, and causes the secondary to return to the primary a sequence of frames containing any data it may have ready. The secondary can only send data to the primary in response to a poll operation; however, the secondary has the capability of sending a uniquely identifiable frame on its own initiative whenever it has data ready to send and has not received a poll. This frame causes the primary to initiate a normal poll even though it has no data ready to send.

29 Claims, 2 Drawing Sheets

POLLING-TYPE DIGITAL COMMUNICATIONS SYSTEM HAVING PSEUDO-BALANCED MODE

BACKGROUND OF THE INVENTION

The present invention relates to electronic communications, and more particularly concerns a multiterminal digital communications system in which one of the terminal units can send data to a second terminal unit at any time, but the second can return data to the first only in response to a poll therefrom.

Digital communications increasingly employs large, often public, networks to connect terminals (sometimes called stations or nodes) at great distances from each other. Such terminals may range from small, single-user displays to communications adapters to complete computers, and even systems of computers. Although the communications protocol of the network is often transparent to the terminals, the terminals themselves must employ a common protocol to govern the exchange of data items between them.

One widely used class of protocols establishes a communications session between two terminals in which one terminal is the primary or master, and the other is a secondary or slave. Mid-range and larger computers and systems normally contain communications equipment capable of acting as either a primary or a secondary terminal. A negotiation protocol at the beginning of each session between two such computers establishes which is which. Nonprogrammable terminals ("dumb heads") are universally capable of functioning only as secondaries. Personal computers and programmable ("intelligent") terminals may function as either. However, the processor power and system resources required to implement the many functions of a primary terminal are normally too expensive and complex to justify their inclusion in such systems. Secondary-terminal functions, on the other hand, can be implemented relatively easily; in many cases, a simple serial port is the only hardware required. Thus, the world will always contain many more secondary terminals than primary.

The Normal Response Mode (NRM) of the Synchronous Data Link Communications (SDLC) protocol of the IBM Systems Network Architecture (SNA) may serve as a paradigm of the primary/secondary class of protocols. When it has data items to send to the secondary, the primary terminal or station encapsulates the data into frames according to a lower-level protocol, then sends the frames consecutively over the network, perhaps converting this frame sequence to a network protocol. The secondary terminal receives the entire sequence of frames, then responds to the primary. If it has data to return to the primary, the response is a sequence of frames carrying the data items; if not, the response is a single "receiver ready" (RR) frame. This supervisory frame provides a positive acknowledgement of the poll; it carries no data.

Because the secondary terminal can only return data to the primary in response to a poll from the primary terminal, the primary must ensure that the secondary need not wait for an unreasonable length of time to send its data. Therefore, the primary initiates a poll at a certain interval even when it has no data to send. In this case, it sends a "receiver ready" (RR) supervisory frame which contains no data, yet allows the secondary to send a frame sequence if it has any data available to send—that is, the primary gives a secondary a "response opportunity." If neither terminal has anything to say to the other, they continue to exchange RR supervisory frames until one of them comes up with some data to send.

A typical default poll interval is 0.25 sec. Yet it is not atypical to have intervals of seconds or minutes without having useful data to send between the terminals; that is, intervals between actual data can easily exceed the maximum polling interval required for heavier usage by several orders of magnitude. Such inefficiency can ring up excessive charges for connect time in a circuit-switched network or for packet numbers in a message-switched network.

Several different kinds of approaches attempt to reduce network expense resulting from this nonproductive polling.

Terminals may disconnect—or be disconnected—from the network. For example, a facility known as short-hold mode disconnects the terminals from the network after a short interval of no data, and reestablishes the connection when requested. This approach is difficult to implement, degrades response time, and may still incur excessive expenses from the large number of individual calls.

The primary terminal may vary its polling interval. Adaptive polling causes the primary to lengthen or shorten the polling interval when the secondary's data rate meets certain criteria. Such systems may increase efficiency, but still represent only the primary's guess at whether or not the secondary has data.

The terminals may employ a non-polling type of protocol. The Asynchronous Balanced Mode (ABM) of the High-level Data Link Control (HDLC) protocol, for example, effectively allows each terminal to be a primary or master station; it is similar to the primary mode of NRM, with the additional capability of each terminal to transmit to the other simultaneously. This is an elegant solution, requiring no unproductive polling at all. However, it requires each terminal to implement substantially all the functions of a primary terminal; as stated above, this is not feasible for nonprogrammable terminals, nor even for most personal computers. An ABM protocol is more difficult to implement than an NRM secondary of an SDLC protocol. Moreover, ABM requires full-duplex links to the network. Many terminals either do not have full-duplex capability, or cannot use it efficiently. Often, the communicating applications at the higher protocol levels operate in half-duplex mode anyway, thus abnegating any advantage in using full duplex at the lower levels.

Another way to eliminate polling is to construct the terminals for a network mode which does not require it. For example, CCITT X.25 networks can be accessed directly in native mode, which uses an ABM protocol. This solution, however, entails an expensive network subscription and dealing directly with the network provider, and ties each terminal to one specific physical location. It also requires more complex and expensive terminal equipment, most often beyond the processor speed and memory resources of a personal computer, and almost always beyond those feasible for a nonprogrammable terminal. But even the smallest terminal can usually run an SDLC NRM-like secondary polling protocol with no more than a commonly available serial port and a relatively small communications program.

The conventional approaches fall short of their goals in one or more particulars. This is especially true when they are implemented in connection with a widely used message-switched network protocol known as X.25 PAD ("packet assembler/disassembler"). Standard PAD networks, as defined by CCITT protocols X.28, X.29, and X.3, can carry strings of ASCII start/stop character codes through an X.25 network in the form of packets. SNA is capable of using X.25 ASCII PAD packets when operating in an asynchronous mode (SNA-A). X.25 PAD is inexpensive. It is also widely accessible, even from dial-up connections in small businesses, homes, and hotel rooms.

SUMMARY OF THE INVENTION

The present invention eliminates or greatly reduces nonproductive polling in a digital communications system having primary and secondary terminals attached to a network. It never introduces excessive delays in sending data from the secondary terminal. Implementation in data terminal equipment is inexpensive and simple; many different kinds of embodiments are technically and economically practical. The invention permits the use of widely available, familiar, and inexpensive networks and protocols, with very little modification. It requires only half-duplex links to the network.

Broadly, the invention links a large communications network to a primary terminal and a secondary terminal using a new protocol which we call "Pseudo-Balanced Mode" (PBM). The primary terminal polls the secondary whenever the primary has data to send. The poll operation sends a sequence of data frames to the secondary, and causes the secondary to return to the primary a sequence of frames containing any data it may have ready. Unlike NRM, the primary need never poll the secondary when it has no data to send, although it may still do so at greatly increased intervals for ancillary purposes.

The secondary can only send data to the primary in response to a poll operation. However, if the secondary has data ready to send at other times, it sends a special frame to the primary on its own initiative. Although this frame has the same overall format as the other frames, and uses exactly the same protocol, it has a unique identifier.

This special frame causes the primary to initiate a poll even though it has no data ready to send. This poll operation is the same as a normal poll according to the conventional protocol, and the secondary acts upon it in the same way as it would respond to a conventional poll.

DETAILED DESCRIPTION OF A PREFERRED EMBODIMENT

Figure 1:
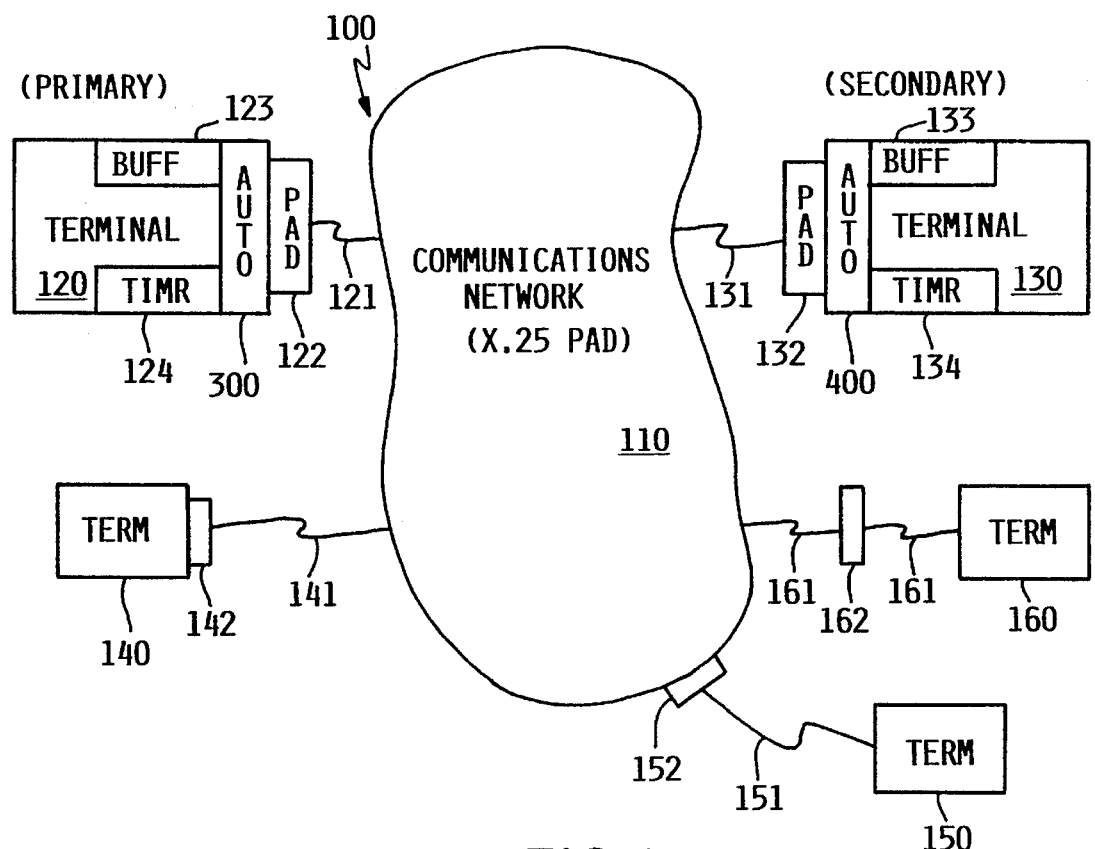
FIG. 1 is a schematic representation of an overall communications system incorporating the invention.
Figure 2:
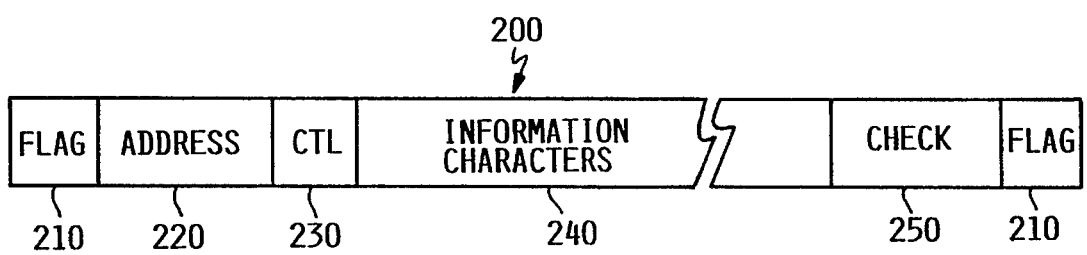
FIG. 2 shows the format of data frames employed by the system of FIG. 1.

FIGS. 1 and 2 show a complete digital communications system 100, conventional at this high level, except as indicated. The overall system has a communications network 110 coupled to a number of terminals or stations 120–160 coupled to network 110 by respective communications links 121-161.

Network 110 in this example may use a standard CCITT X.25 PAD protocol for transferring data packets in both directions between any pair of terminals, such as between terminals 120 and 130. Other terminal pairs may communicate concurrently through the same network. Any or all of the terminals may be part of, or physically reside in, a computer; they may also be standalone terminals. Links 121-161 are of conventional design. Packet assembly/disassembly devices (PADs) 122–162 convert data between the packet format of the network and whatever format the terminals employ; this conversion is transparent to the terminals themselves. PADs may be physically located within the terminals, as at 122–142; alternatively, they may be located within network 110 as at 152, or at any point along a link, as at 162.

In this illustrative environment, the terminal format is High-level Data Link Control (HDLC) or Synchronous Data Link Control (SDLC) data frames in the widely used IBM Systems Network Architecture (SNA) protocol. FIG. 2 depicts the layout of an SDLC frame 200. Unique flag codes 210 delimit the frame at each end. Address field 220 contains bytes which specify the destination address of the terminal to receive the frame. Control field 230 specifies that the frame is one of a number of frame types, and performs other functions. Data field 240 contains the actual data characters or other items. This field is present only if the frame's control field identifies it as an "information" (I) type frame; other, supervisory, frame types omit it. Check field 250 contains an error detection or correction code, such as a cyclic redundancy check (CRC), for the frame.

Table 1 below shows the layout of the one-byte control field 230 for the relevant SDLC frame types. The individual bits are labelled C0–C7.

TABLE 1

| Frame Type | C0 | C1 | C2 | C3 | C4 | C5 | C6 | C7 |
|---|---|---|---|---|---|---|---|---|
| Information (I) | NR | NR | NR | PF | NS | NS | NS | 0 |
| Rec. Ready (RR) | NR | NR | NR | 1 | 0 | 0 | 0 | 1 |
| Req. Response (RRO) Opportunity | 0 | 0 | 1 | 1 | 0 | 0 | 1 | 1 |

In the conventional I-type frame, the three bits labelled NR represents the ordinal number of frame to be received in the next sequence. The three bits labelled NS represent the ordinal number of the current information frame in the current sequence of contiguous I-type frames. These numbers are not relevant here, except in that they impose a maximum number of frames (i.e., seven) which can be sent in a contiguous sequence. Bit C3, labelled PF, is a poll-final bit: if the current frame is the last of a sequence, PF:=1; otherwise, PF=0. The value of the last bit, C7=0, identifies the frame as an I-type frame.

Bits C4–C7=0001 identifies a frame as a conventional RR-type frame. Bit C3 is the poll-final bit for an RR frame also, but these frames are always the last frame in a sequence, so that PF=1 always.

The new RRO frame type is technically a kind of "unnumbered frame" in SDLC; its control code, hex '33', is not used by standard protocols. Again C3 is a poll-final bit, but its value is always PF=1, because an RRO frame is always the only frame of a sequence.

We shall describe an embodiment of the invention with respect to a communications session between two terminals 120 and 130, FIG. 1, using SDLC frames 200, FIG. 2, according to a modification of the normal response mode (NRM) of the SNA protocol. The invention requires an additional timer (or timer function) in the secondary terminal. A conventional primary terminal already has a timer corresponding to 124. The communications protocols for exchanging data frames between the two terminals are carried out by automata 300 and 400 within their respective terminals 120 and 130. Data buffers 123 and 133 store any data items within one terminal that are ready to send to the other terminal. Timers 124 and 134 may be included for poll and response timing.

Under SDLC NRM, SNA sets up a session such that one terminal is a primary or master terminal 120, and the other is a secondary or slave terminal 130. Many terminals, especially those incorporated into computers as communications adapters, have the capability of functioning in either role, in response to a mode setting from an operating system, an application program, user input, or a negotiating sequence at the beginning of a session with another terminal. Smaller terminals, such as personal computers and remote nonprogrammable terminals, can only function as secondaries. Although these terminals may participate in a session negotiation, they always end up as secondaries.

Broadly, primary terminal 120 controls the session by initiating a poll operation whenever it has one or more data items ready to send to secondary 130. Primary 120 initiates the poll by sending a sequence of contiguous I-type frames, each incorporating a data item from buffer 123, FIG. 1. The last frame in the sequence has its poll-final bit set, PF=1, to indicate the end of the sequence. The last frame represents the last data item available in buffer 123, or the seventh data item, if more than that are available. A sequence of frames from the primary to the secondary is usually referred to as a "poll."

Secondary 130 can send one or more data frames to primary 120 only in response to a poll. Immediately after receiving the poll sequence from the primary, the secondary initiates a response operation. If its buffer 133 has data items ready to send back to the primary, it sends a sequence of I frames, each carrying one item. The last frame in this response sequence has its PF=1. Again, a maximum of seven frames can be sent; if more are available, they must wait for another poll. If the secondary buffer 133 has no data available when the poll sequence arrives, it sends a response sequence consisting of a single RR-type frame. This indicates that the secondary has successfully received the poll.

When the primary has received the last frame of the response sequence, it initiates another poll operation if it has further data to send, either because further data is newly available, or because more than seven items were ready at the preceding poll. The secondary again performs a response operation, sending one or more I frames, or a RR frame, in a further response sequence. Poll and response operations continue uninterruptedly as long as the primary has data ready when a response operation finishes; this situation represents the maximum data rate between these two terminals of the system.

If the secondary has data ready but the primary does not, conventional poll-type systems require the secondary to wait until the next poll operation from the primary. In these systems, a poll timer in the primary causes it to initiate a poll operation periodically, even when it has no data to send. In the present system, however, the secondary initiates a request-response-opportunity (or merely "request") operation whenever it has data items ready to send. The secondary sends a new RRO frame type to the primary, which causes the primary to initiate a poll operation even though it may have no data to send. This poll gives the secondary an opportunity to perform a normal response operation, sending its data items in a conventional sequence of I frames.

Figure 3:
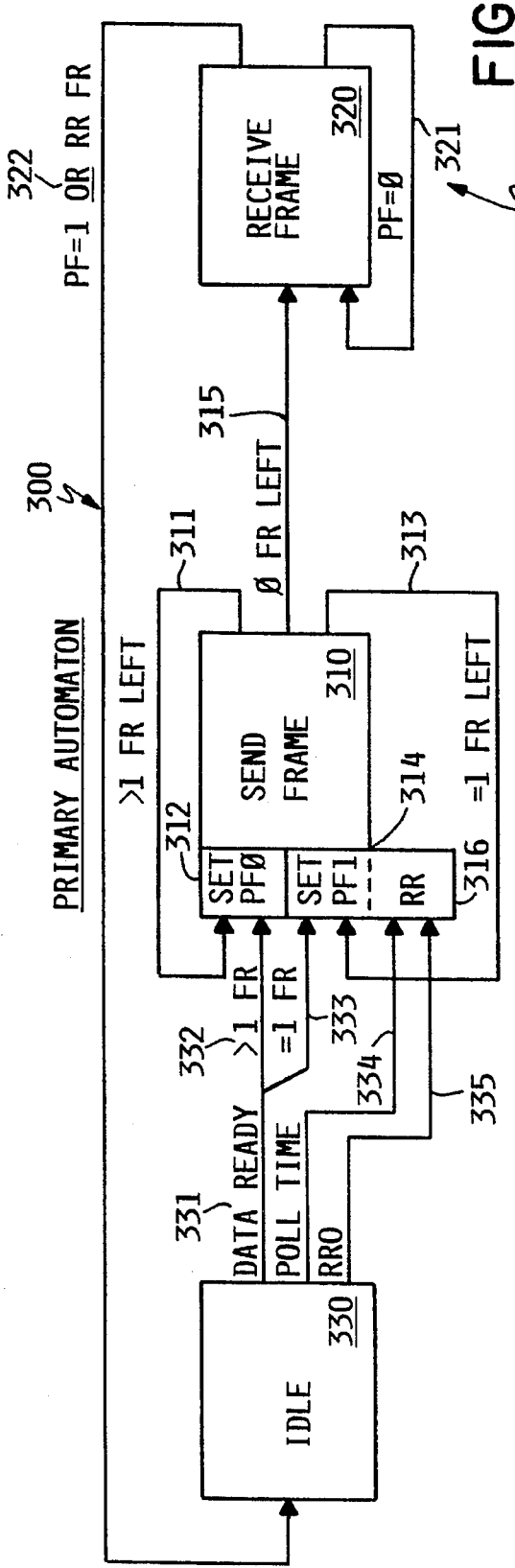
FIG. 3 is a diagram of a portion of a primary terminal of FIG. 1.
Figure 4:
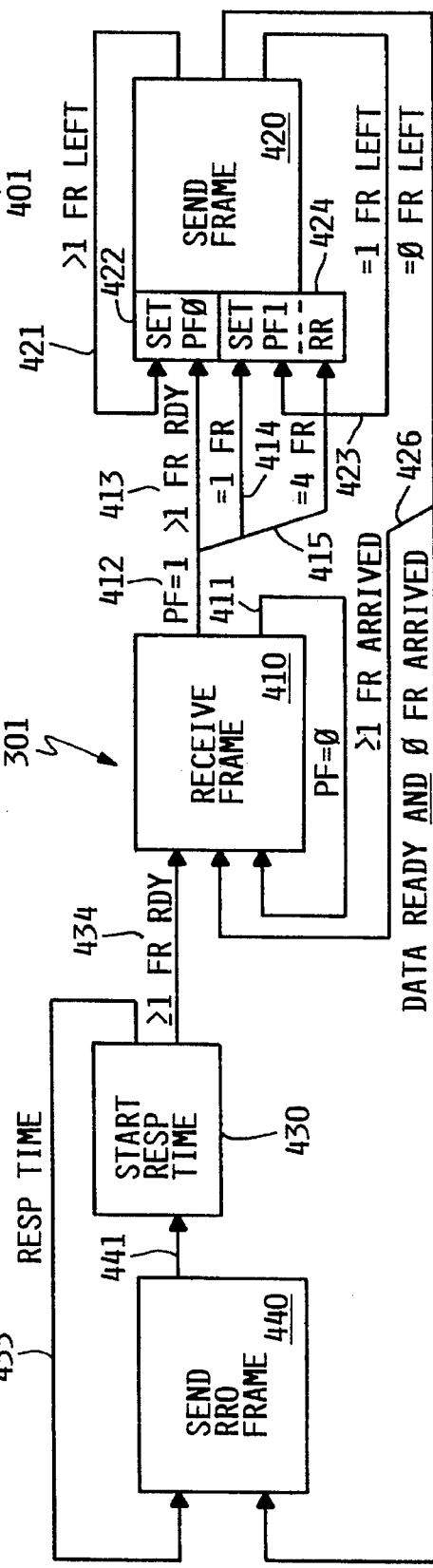
FIG. 4 is a diagram of a portion of a secondary terminal of FIG. 1.

FIGS. 3 and 4 represent the relevant protocol aspects as finite-state automata 300 and 400 physically implemented in terminals 120 and 130, respectively. Such representations, sometimes also known as sequential machines, are common in this technical field, and can easily be directly realized in many different forms, such as random wired logic, structured logic (including programmable-array logic and read-only memories), and decision trees executed as conventional program instructions by a microprocessor. FIGS. 3 and 4 show only enough of the conventional NRM to demonstrate how to modify it according to our invention. Conventional setup and termination sequences, frame exchanges for error recovery, and other aspects of the protocol, are not changed by the invention.

FIG. 3 shows the finite-state automaton 300 of a primary terminal 120, FIG. 1. Suppose that an SNA communications session has been set up, and primary 120 finds itself in the Send Frame state 310. In this state, primary 120 sends an I-type SDLC frame to secondary terminal 130, FIG. 1. Arrow 301 symbolizes the path of packet-conversion and transmission performed by PAD 122, link 121, network 110, link 131, and PAD 132 of FIG. 1 upon a data frame. The state of the frame's poll-final (PF) bit depends upon whether or not any more data is available to send as another frame in the current sequence.

If, after transmitting this frame, the primary has multiple data frames left to send in the current sequence (that is, the frame currently being sent is neither the last data item ready to send, nor is it the sixth or seventh frame in the current sequence), condition 311 returns the primary to state 310 to send another frame. Condition 311 also causes substate 312 to turn off the poll-final bit (i.e., to set PF=0), for the following frame. If, alternatively, the frame just transmitted was the penultimate or the sixth frame of the current sequence, then the next frame will be the last frame of the sequence; in this case, condition 313 returns to state 310 via substate 314, which sets the poll-final bit on (PF=1), for the following frame. In the final alternative, condition 315 becomes active after state 310 has transmitted the last frame in the sequence; this condition occurs when the primary has no more data items available to send, or the preceding frame had reached the maximum number allowed in a sequence: seven, in this example.

Condition 315 causes primary terminal 120 to enter state 320, Receive Frame. In this state, the primary receives a data frame from secondary 130. Arrow 401 symbolizes the path of conversion and transmission processes of FIG. 1, from PAD 132 via link 131 through network 110, thence via link 121 to PAD 122, performed upon a data frame transmitted from the secondary to the primary. The data characters in the frame are posted in a normal manner within the secondary; they may be merely stored, or may initiate some action. If the received frame had its poll-final bit set off (PF=0), then condition 321 immediately reenters state 320 to receive another frame in the current sequence. If, on the other hand, PF=1 in the received frame indicates that it was the last—or only—frame in the sequence, then condition 322 causes the primary to move to state 330. Condition 322 also becomes active when the frame had an RR type designation in its control field; this indicates that the secondary successfully received the poll, but had no data to send.

State 330 is an idling state as far as the communications protocol is concerned, although other unrelated activity may be taking place within terminal 120. As in the conventional NRM protocol, condition 331 causes the terminal to enter state 310 whenever buffer 123 has one or more data items ready to send to the secondary. That is, condition 331 initiates another poll operation. For multiple items ready, subcondition 332 causes substate 312 to set PF=0 for the frame to be transmitted by state 310; for only a single item, subcondition 333 causes substate 314 to set PF=1, indicating only one I-type frame in the poll sequence.

As stated previously, the conventional NRM protocol requires a periodic poll operation even in the absence of data to send; when poll timer 124, FIG. 1, times out, condition 334 causes state 310 to initiate a poll operation at such time. Although not required for the pseudo-balanced mode of the invention, condition 334 may be retained as a keep-alive or deadlock-prevention mechanism if desired. The poll interval, however, can be made very much longer than normal. Whereas avoiding unreasonable data delay may force a conventional interval to be as little as 0.25 sec, the interval may be measured in minutes or even hours for the present mode. Condition 334 initiates a poll operation by causing state 310 to send a frame. Because it will be the only frame in a sequence, substate 314 sets PF=1. Also, because there is no data available to send, this substate causes the frame to have an RR type designation, as shown at 316.

Condition 335 from state 330 is added to NRM to enable the primary to carry out its part of the invention. As described in connection with Table I above, a "request response opportunity" (RRO) frame is a new frame type, having a unique type designation in control field 230 of frame 200, FIG. 2. Condition 335 recognizes the arrival at primary terminal 120 of a frame having this type, and causes the terminal to enter state 310 via substate 314 at 316: that is, the frame sent will be an RR-type frame (which necessarily has PF=1). State 310 thus sees condition 335 as being identical to a poll timeout from condition 334 with no data ready to transmit. State 310 then sends an RR supervisory frame having no data characters, just as it would have had the poll timer expired.

FIG. 4 shows the finite-state automaton 400 of a secondary terminal 130, FIG. 1. State 410 of the secondary receives a data frame which had been transmitted by state 310 of the primary 120 over path 301. If the frame contains data characters, they are stored or acted upon as described above in connection with state 320, FIG. 3. Afterward, if the frame had PF=0, indicating that more frames are to follow in the current sequence, then condition 411 reenters state 410. This condition mimics condition 321 of FIG. 3. Condition 412, PF=1, signals that the received frame was the last—or only—frame of the sequence. If, at that time, the secondary has multiple data items ready to transmit to the primary, subcondition 413 enters state 420 via substate 422; if one item or no items are ready at that time, subconditions 414 and 415 transit substate 424 into state 420. Subcondition 415 additionally selects at 424 an RR-type frame in place of the I-type frame which state 420 would otherwise send.

State 420 sends a frame from secondary 130 to primary 120 via path 401. State 420 functions in substantially the same way as does state 310 of FIG. 3. The frame is an I frame having its PF bit set to PF=1 or PF=0, according to whether state 420 had been entered via substate 422 or 424. Condition 415, however, changes the frame type to RR (which always has PF=1) if the secondary has no data ready to send in its response sequence. After a frame has been sent, condition 421 returns to substate 422 when multiple data items remain to be sent to the primary, while condition 423 returns to substate 424 when only one item remains—that is, after the penultimate frame in the sequence has been transmitted by state 420. Condition 425 becomes active after the last frame in the sequence has been sent; as in the case of the primary terminal, this condition may occur either when the secondary has no more data items ready to send, or when it has sent seven (or some other maximum number) of frames in the current sequence. Subcondition 426 signals that a frame has arrived from the primary by the time the response sequence has ended; this initiates another response operation by entering state 410.

States 410 and 420 as thus far described follow the conventional normal response mode (NRM) of the SNA protocol. We have added two additional states, 430 and 440, to the repertoire of secondary terminal 130.

When condition 425 indicates that state 420 has sent the last frame in a sequence, no frames have arrived, and the secondary has no data ready to send, automaton 400 waits at the output of state 420. If data becomes available in buffer 133, FIG. 1, before a frame arrives from the primary for another poll, subcondition 427 causes state 440 to send an RRO frame to the primary. This frame is sent via the same path 401 as any other frame to the primary. As described above, the RRO frame satisfies condition 335, FIG. 3, and thus causes state 310 to initiate a poll operation as soon as the secondary has data items to send, without any poll-interval delay whatsoever.

State 440 unconditionally enters state 430 when the RRO frame has been sent. State 430 starts response timer 134 located within the secondary terminal 130, FIG. 1. This timer assures that the RRO frame has not got lost or corrupted within the system. If a frame arrives before the response interval expires, condition 434 enters state 410. This condition occurs when the primary has initiated a new poll operation within the response interval—either because it has reacted to the RRO frame (condition 335), or because it has data ready to send (condition 331), or even because it is already in the process of conducting a poll. That is, the primary can afford to lose the RRO frame if it has already begun a poll. The secondary will neither know nor care that the RRO frame has been lost in this case; it obtains an opportunity to send its data anyway. The error resolution of this approach is both simple and effective.

The response interval set into timer 134 should exceed twice the maximum expected network delay, plus turn-around time at the primary. Three to ten seconds is a representative interval which accommodates most X.25 PAD networks without introducing an unreasonable delay at the secondary. In some cases it might be desirable to use a settable or variable response interval. For example, the capability of both terminals to initiate frame transmission in this invention might require some attention to the selection of poll and response intervals in order to prevent a deadlock from arising where one or both of the terminals is half-duplex and the communications links are full-duplex.

But, if the response interval expires before a frame arrives, condition 433 enters state 440 to send another RRO frame, and restart the response timer. That is, if the primary loses an RRO frame without starting a further poll, the secondary will automatically retry its request operation in state 440. Automaton 400 may sense an excessive number of retries and instigate a conventional error operation (not shown), if desired.

Table 2 below shows the operation of a conventional Normal Response Mode system on the left side, and compares it with the new Pseudo Balanced Mode according to the invention on the right side. Arrows indicate the direction of frame transmission. Equal signs in a state column indicate that the automaton remains in its previous state.

TABLE 2

| NORMAL RESPONSE MODE | | | PSEUDO BALANCED MODE | | |
|---|---|---|---|---|---|
| PRIMARY STATE | FRAME TYPE (PF) | SECONDARY STATE | PRIMARY STATE | FRAME TYPE (PF) | SECONDARY STATE |
| (Primary has four frames to send; secondary has two available to return.) | | | | | |
| Send | —I(0)→ | Rec. | Send | —I(0)→ | Rec. |
| Send | —I(0)→ | Rec. | Send | —I(0)→ | Rec. |
| Send | —I(0)→ | Rec. | Send | —I(0)→ | Rec. |
| Send | —I(1)→ | Rec. | Send | —I(1)→ | Rec. |
| Rec. | ←I(0)— | Send | Rec. | ←I(0)— | Send |
| Rec. | ←I(1)— | Send | Rec. | ←I(1)— | Send |
| = | = | = | | —RR(1)→ | = |
| = | = | = | Idle | ←RR(1)— | = |
| (Primary has one frame in send; secondary has no data to return.) | | | | | |
| Send | —I(1)→ | Rec. | Send | —I(1)→ | Rec. |
| Rec. | ←RR(1)— | Send | Rec. | ←RR(1)— | Send |
| = | = | = | Idle | | = |
| (Primary has nothing to send; secondary has one frame to send. Poll interval has not expired.) | | | | | |
| = | = | = | Send | ←RRO(1)— | SendRRO;Start |
| = | = | = | Send | —RR(1)→ | Rec. |
| = | = | = | Rec. | ←I(1)— | Send |
| = | = | = | | —RR(1)→ | = |
| = | = | = | Idle | ←RR(1)— | = |
| ( . . . Poll interval now expires.) | | | | | |
| Send | —RR(1)→ | Rec. | = | | = |
| Rec. | ←I(1)— | Send | = | | = |
| = | —RR(1)→ | = | = | | = |
| = | ←RR(1)— | = | = | | = |
| (Neither terminal has data available to send. Poll interval expires numerous times for NRM) | | | | | |
| Send | —RR(1)→ | Rec. | = | | = |
| Rec. | ←RR(1)— | Send | = | | = |
| Send | —RR(1)→ | Rec. | = | | = |
| Rec. | ←RR(1)— | Send | = | | = |
| Send | —RR(1)→ | Rec. | = | | = |
| Rec. | ←RR(1)— | Send | = | | = |

We claim as our invention:

1. A digital communications system, comprising:

a communications network;

at least two links coupled to said network for transmitting data frames to each other through said network, said frames being of different types, at least one of which types contains data items;

a primary terminal coupled to a first of said links, said primary terminal including primary buffer means for storing primary data items ready to send to a secondary terminal, and poll means for sending a first sequence of said data frames incorporating at least some of said primary data items if any are available in said primary buffer means, and for thereafter receiving a second sequence of said data frames in a poll operation initiated within said primary terminal, said poll means initiating said poll operation in response to the availability of said primary data items in said primary buffer means and also in response to the receipt on said first link of a data frame of a preselected one of said types;

a secondary terminal coupled to a second of said links, said secondary terminal including secondary buffer means for storing secondary data items ready to send to said primary terminal, and response means for receiving said first sequence of data frames and for thereafter sending said second sequence of data frames incorporating at least some of said secondary data items if any are available in said secondary buffer means in a response operation initiated in response to said poll operation from said primary terminal, said response means further sending to said primary terminal via said network a further data frame of said preselected one of said types at a time determined by the availability of said secondary data items in said secondary buffer, independently of any prior poll operation in said primary terminal.

2. Claim 1, wherein said network is a packet network having charges based upon number of packets communicated rather than upon connection time.

3. Claim 2, wherein said links both include assembler/disassembler means for converting between said frames and said packets.

4. Claim 1, wherein at least one of said links is a half-duplex link.

5. Claim 4, wherein both of said links are half-duplex links.

6. A method for transmitting digital data frames incorporating data items via an external communications network in both directions between a primary terminal and a secondary terminal, comprising the steps of:

(a) initiating at said primary terminal only a poll operation when a primary data item becomes available at said primary terminal, said poll operation including (1) sending a first sequence having one or more data frames incorporating said primary data items;

(b) immediately thereafter, performing a response operation at said secondary terminal, said response operation including
(1) receiving said first sequence of data frames,
(2) sending a second sequence having one or more data frames incorporating secondary data items available at said secondary terminal,
(c) thereafter, at a time when a secondary data item becomes available at said secondary terminal, said time being independent of any poll operation from said primary terminal, sending a uniquely identifiable data frame to said primary terminal;
(d) initiating at said primary terminal a further poll operation at a further time determined by the receipt of said uniquely identifiable frame, independently of the availability of a primary data item at said primary terminal and independently of any prior poll operation.

7. Claim 6, wherein said poll operation of step (d) is identical to that of step (a), except for the conditions of its occurrence.

8. Claim 6, wherein the frames of said first sequence are sent contiguously without interruption by any frames from said secondary terminal.

9. Claim 8, wherein each frame of said first sequence contains a designation of whether or not it is a final frame of said first sequence.

10. Claim 8, wherein said first sequence has a predetermined maximum number of frames.

11. Claim 8, wherein the frames of said second sequence are sent contiguously without interruption by any frames from said primary terminal.

12. Claim 11, wherein each frame of said second sequence contains a designation of whether or not it is a final frame of said second sequence.

13. Claim 11, wherein said second sequence has a predetermined maximum number of frames.

14. Claim 6, including the further step of:
(e) initiating at said primary terminal a further poll operation at the expiration of a predetermined poll time interval, independently of the availability of a primary data item at said primary terminal or receipt of said uniquely identifiable frame.

15. A primary communications terminal for exchanging digital data frames via a network with a secondary terminal, comprising:
a primary data buffer holding data items ready for transmission to said secondary terminal;
a primary automaton having states for sending and receiving said data frames in a poll operation initiated for said data items in said data buffer, said primary automaton having a further state capable of initiating said poll operation independently of said data items in said data buffer, at a time determined by the receipt from said network of a data frame of a unique type via said network from said secondary terminal.

16. Claim 15, wherein said primary automaton comprises:
(a) a state for sending a data frame to said secondary terminal, followed by
(1) if said sent frame is the last of a sequence, then state (b),
(2) otherwise, state (a);
(b) a state for receiving a data frame from said secondary terminal, followed by
(1) if said received frame is the last of a sequence, then state (c),
(2) otherwise, state (b);
(c) a further state, followed by
(1) if a data frame having said unique type has arrived at said primary terminal, then state (a).

17. Claim 16, wherein state (c) is followed by
(2) if said primary terminal has data ready to send, state (a).

18. Claim 17, wherein said primary terminal further comprises a poll timer defining a poll interval, and wherein state (c) is followed by
(3) if said poll interval expires, then state (a).

19. Claim 16, wherein each of said frames includes a poll-final designation indicating whether it is the last frame in a sequence, and wherein state (a) includes:
(aa) a substate for resetting said poll-final designation, followed by state (a);
(ab) a substate for setting said poll-final designation, followed by state (a);
and wherein condition (a)(1) includes subconditions:
(1.1) if said primary terminal has multiple data frames ready to send, then substate (ba),
(1.2) if said primary terminal has no data frames ready to send, then substate (bb).

20. Claim 19, wherein condition (a)(1) includes the further subcondition:
(1.3) if said communications terminal has one data frame ready to send, then substate (ab).

21. Claim 19, wherein condition (b)(2) includes subcondition:
(2.1) if the next frame of said sequence is prior to the last frame of said sequence, then substate (ba).

22. A secondary communications terminal for exchanging digital data frames via a network with a primary terminal, comprising:
a secondary data buffer holding data items ready for transmission to said primary terminal;
a secondary automaton having states for receiving and sending said data frames exclusively in response to a poll operation from said primary terminal, said secondary automaton having a further state responsive to the availability of said data items in said secondary data buffer for sending to said primary terminal via said network a further data frame having a unique type, for the purpose of initiating said poll operation at said primary terminal, said further data frame being sent at a time determined by the availability of said data items and independently of any prior poll operation from said primary terminal.

23. Claim 22, wherein said secondary automaton comprises:
(a) a state for receiving a data frame from said primary terminal, followed by
(1) if said received frame is the last of a sequence, then state (b),
(2) otherwise, state (a);
(b) a state for sending a data frame to said primary terminal, followed by
(1) if said sent frame is the last of a sequence ready for transmission to said primary, then
(1.1) if a frame has arrived from said primary terminal, then state (a),
(1.2) otherwise, state (c);
(2) otherwise, state (b);
(c) a state for sending to said primary terminal a data frame having a unique type designation, followed by
(1) state (a).

24. Claim 23, wherein each of said frames includes a poll-final designation indicating whether it is the last frame in a sequence, and wherein state (b) includes:
- (ba) a substate for resetting said poll-final designation, followed by state (b);
- (bb) a substate for setting said poll-final designation, followed by state (b);

and wherein condition (a)(1) includes subconditions:
- (1.1) if said communications terminal has multiple data frames ready to send, then substate (ba),
- (1.2) if said communications terminal has no data frames ready to send, then substate (bb).

25. Claim 24, wherein condition (a)(1) includes further subcondition:
- (1.3) if said communications terminal has one data frame ready to send, then substate (bb).

26. Claim 24, wherein condition (b)(2) includes subcondition:
- (2.1) if the next frame of said sequence is prior to the last frame of said sequence, then substate (ba).

27. Claim 23, wherein said primary terminal includes an automaton having:
- (a') a state for sending a data frame to said secondary terminal, followed by
   - (1') if said sent frame is the last of a sequence, then state (b'),
   - (2') otherwise, state (a');
- (b') a state for receiving a data frame from said primary terminal, followed by
   - (1') if said received frame is the last of a sequence, then state (c'),
   - (2') otherwise, state (b');
- (c') a further state, followed by
   - (1') if a data frame having said unique type has arrived at said primary terminal, state (a').

28. Claim 27, wherein state (c') is followed by
- (3') if said primary terminal has data ready to send, state (a').

29. Claim 23, wherein said secondary terminal further comprises a response timer having a predetermined response interval, and wherein said secondary automaton further comprises:
- (d) a state for starting a response timer having a predetermined response interval, followed by
   - (1) state (a), and wherein state (d) proximately follows state (c).

* * * * *